Feb. 25, 1958
H. E. TRACY
2,824,759
LIQUID COOLED SEAL
Filed Oct. 31, 1955
2 Sheets-Sheet 1
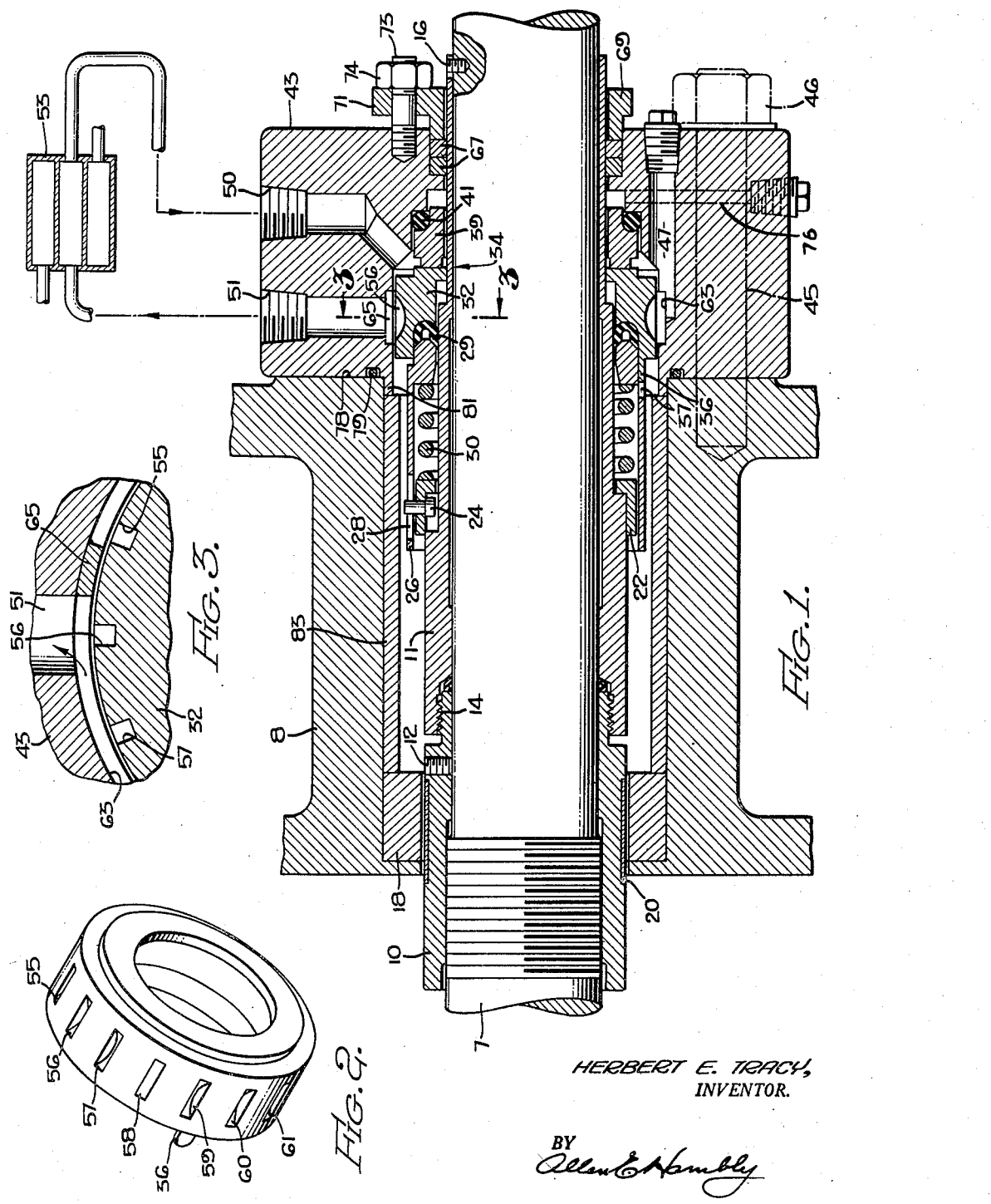
HERBERT E. TRACY,
INVENTOR.
BY
Allen E. Hambly
ATTORNEY

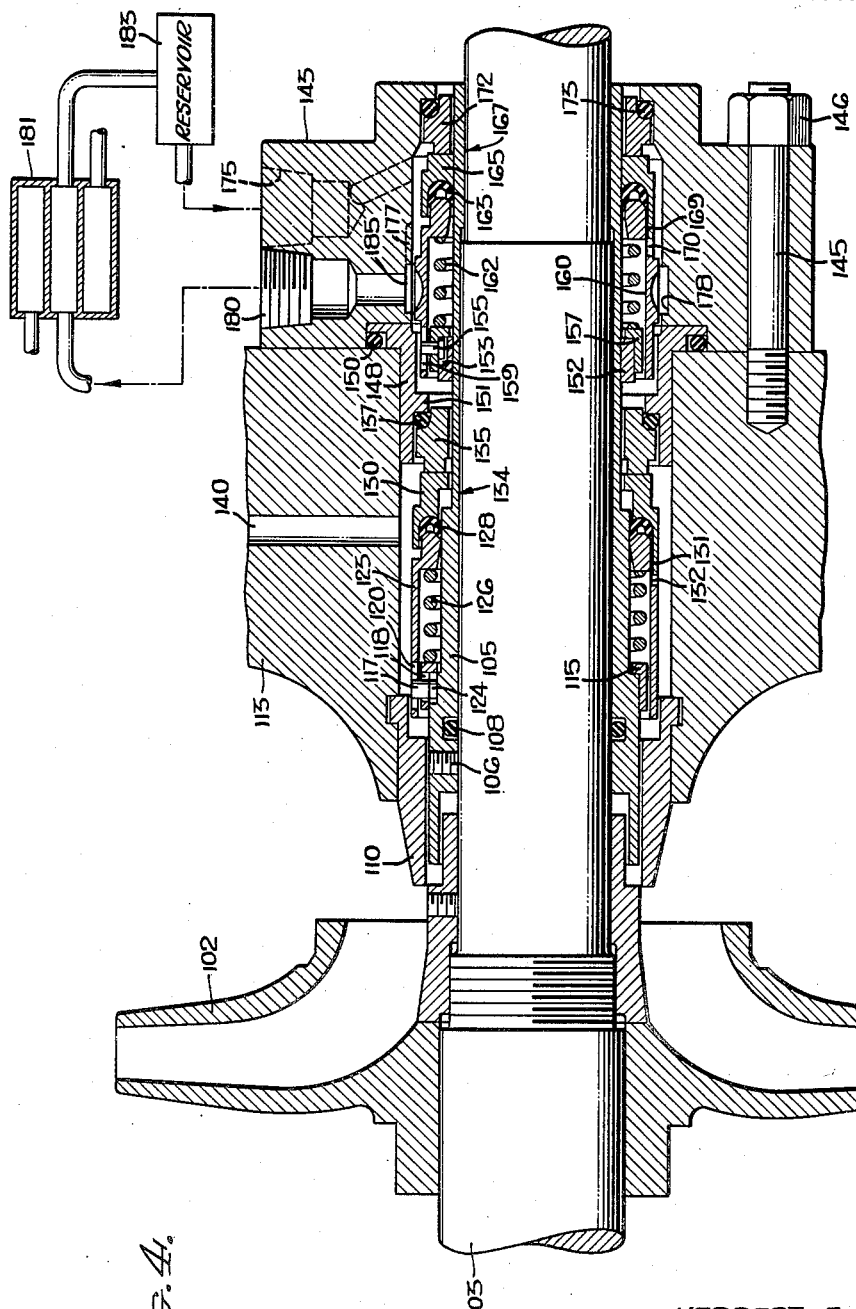

__United States Patent Office__

2,824,759
Patented Feb. 25, 1958

2,824,759

LIQUID COOLED SEAL

Herbert E. Tracy, Alhambra, Calif., assignor to Borg-Warner Corporation, Chicago, Ill., a corporation of Illinois Application October 31, 1955, Serial No. 543,715

6 Claims. (Cl. 286—9)

The present invention relates to an improved apparatus for sealing of a rotating shaft to a housing within which it rotates. It has special application as a replacement for conventional packing in the shaft stuffing box of a centrifugal pump.

In the usual centrifugal pump, an impeller is carried on a rotating shaft. The shaft turns within a bearing set into the pump housing. The shaft projects out through a stuffing box formed in the wall of the pump housing, and is rotated by suitable drive means. In order to prevent leakage of the pump fluid along the shaft, various sealing arrangements have been used. In some cases, where temperatures and pressures are low, adequate sealing has been obtained by merely filling the stuffing box with suitable packing materials. Often, however, additional sealing has been provided by the use of one or more so called mechanical seals along the shaft. Such mechanical seals usually consist of a fixed member and a spring pressed axially movable member in sealing engagement with the fixed member. Either member may be arranged to rotate with and be sealed to the pump shaft.

In other arrangements the packing has been eliminated from the stuffing box, and replaced with a mechanical seal assembly. Complete cartridge type units containing the mechanical seals have been utilized so that the units can be assembled at the factory, and sent out to be used in the stuffing boxes of any of a number of different makes and types of pumps. Such an arrangement is particularly desirable since the seals do not have to be specifically designed according to the internal configuration of any particular pump.

With such stuffing box seals, and where elevated temperatures are encountered, it has been found necessary and desirable to bathe the mechanical seals in a fluid. This lubricates the friction surfaces, and also conducts heat out of the seal.

In the past it had usually been necessary to provide fluid passages through the pump casing so that fluid could be pumped into and out of the pump stuffing box. This is undesirable because it is difficult to do on a pump already set in place, and it also creates problems if ever the seal assembly were to be removed and packing used again.

To remedy this it has been more common of late to fashion the assembly so that the coolant flow passages are bored through an end flange rather than through the pump walls. It is in such a seal unit that the present invention finds utility.

The instant invention is not, strictly speaking, a cartridge seal that is inserted in a stuffing box as a unit. Rather it is usually shipped in disassembled form and put together on a pump shaft in the field. When in position, it replaces the conventional packing in a shaft stuffing box, and prevents leakage by means of one or more mechanical seals.

Applicant's invention is specially designed to be used where high temperature fluids are being pumped. Conventional sealing materials can not long withstand elevated temperatures, and so applicant has provided a unique arrangement whereby adequate cooling is obtained. So successful has the invention been that even though fluids at temperatures exceeding 500° F. are pumped, the temperatures adjacent the mechanical seals are reduced to about 70° F.

The heart of the invention resides in the circulation system for thec oolant-lubricant. A novel pumping action is provided by using the rotating member of one mechanical seal as an impeller. This arrangement avoids the use of an external pumping arrangement which would complicate and add to the expense of an installation. The use of a secondary impeller is not novel per se, since such an impeller has been used before in pump seal cooling systems. However, to applicant's knowledge, no impeller such as applicant's has ever been used outside the pump proper, where no special modification of the pump or the internal walls of the stuffing box is required.

The invention is disclosed herein in two forms. In the preferred embodiment only one mechanical seal is utilized, whereas in the second form two mechanical seals are used. Both embodiments include a member that rotates with a shaft as part of a mechanical seal, and which has transverse concave depressions on its periphery to impel the liquid around a pressure chamber formed in a flange which is detachably secured to the outer end wall of the pump housing. In the preferred embodiment the coolant used is the same fluid that is pumped by the primary impeller. In the second embodiment there is illustrated an assembly wherein it is preferable to use a different coolant from that which is pumped by the primary impeller.

Accordingly it is an object of the invention to provide a seal assembly partially within a shaft stuffing box, including a cooling circuit, and an impeller within the seal which is carried externally of the stuffing box, and which assembly replaces the packing conventionally utilized in a stuffing box.

It is another object of the invention to provide an assembly for sealing a rotating shaft within a housing, the assembly including a closure flange adapted to be detachably secured to the housing wall, a mechanical seal unit within the closure flange arranged to seal off flow along the shaft and also to pump coolant through the assembly.

It is a still further object of the invention to provide a liquid cooled and lubricated seal assembly for sealing a pump shaft to the pump housing, the assembly including means detachably secured to the outside of the housing and within which is carried impeller means to pump coolant through the seal.

It is a still further object of the invention to provide an assembly for sealing a pump shaft to a pump housing including at least one mechanical seal having peripheral impeller means on its rotating member cooperating with an annular pressure chamber formed within a flange member fastened to an end face of the pump housing, the impeller means being effective to circulate coolant around the mechanical seal.

Other objects and advantages will become apparent from the following detailed description taken in connection with the accompanying drawings.

In the drawings:

Figure 1 is a cross-sectional view of a preferred embodiment of the seal assembly.

Figure 2 is an isometric view of the rotating member of the mechanical seal illustrated in Figure 1.

Figure 3 is a broken sectional view taken along the line 3—3 of Figure 1.

Figure 4 illustrates a second embodiment of the invention. It also is a cross sectional view of the seal assembly.

In Figure 1 rotating shaft 7 turns within housing 8. Shaft 7 may carry a pump impeller such as 102 in Figure 3, and housing 8 may be the wall of a centrifugal pump. The seal assembly finds special application in sealing a pump shaft within its housing, although it may be utilized with other mechanisms wherein a shaft rotates in a housing, and an effective seal between the two must be obtained.

Shaft 7 is enveloped within a two piece sleeve, the two halves of which are designated as 10 and 11. Member 10 is affixed to the shaft 7 by means of set screw 12. Members 10 and 11 are held together by screw threads 14, and member 11 is pinned to shaft 7 by means of set screw 16. Bearing block 18 is carried within housing 8, and a hard surfaced collar 20, carried by member 10 forms a bearing surface so that the shaft 7 may rotate within the bearing 18. There is enough clearance between bearing 18 and collar 20 so that some of the fluid being pumped can pass between the two, and assist with lubrication and cooling of the mechanical seal assembly 34.

A cup shaped member 22 has two diametrically opposite slots within which pins such as 24 are mounted. Only one such pin is illustrated in Figure 1 inasmuch as it is desired to illustrate the complete configuration of member 22. Spring holder 26 overrides cup member 22, and the pins 24 extend radially into slots such as 28, within the spring holder 26. There are two slots 28 just as there are two pins 24, but only one is illustrated in order that the spring holder may be completely depicted. The slots do not open at the left ends thereof as illustrated in Figure 1. This arrangement is necessary so that when spring holder 28 is urged to the right by spring 30, it can not be disengaged from the pins 24. The parts therefore remain together as they are assembled in place.

Spring holder 26 bears against a U-shaped sealing element 29, which is effective to prevent flow of fluid between the spring holder 26 and the shaft sleeve 11. Within spring holder 26 spring 30 is effective to force the spring holder against the sealing element 29 and the rotating member 32 of the mechanical seal assembly 34. Member 32 rotates with the spring holder 26 inasmuch as it is connected thereto by means of ears 36. Ears 36 extend into longitudinal slots cut out of the spring holder as for example at 37. For convenience of illustration again, only one ear and slot is depicted in Figure 1.

The rotating member 32, which is preferably fashioned from a hard metal such as stellite forms a seal with stationary member 39. Member 39 is preferably formed of carbon. It is restrained from rotation by frictional contact with O-ring 41. O-ring 41 is similarly held in place by frictional contact with the inner wall of end flange 43. The mechanical seal assembly 34 is carried within end flange 43, which is bolted to housing 8 by means of a plurality of nut and bolts such as 45 and 46. The end flange 43 is arranged to fit tightly against the end face 78 of pump housing 8, and to seal against it by means of O-ring 79. Member 43 has an inwardly extending flange 81 which just fits within the mouth of the pump stuffing box, and bears against liner 83. Liner 83 is effective to retain bearing 18 in place.

An inlet tap 50 is bored into end flange 43, and likewise an outlet tap 51 is also provided. Cooling and lubricating fluid is circulated from inlet 50 into and around mechanical seal assembly 34. It then passes through the communication channel 47, is forced through outlet tap 51, passed through heat exchanger 53 and returned to inlet 50. It will be observed that the fluid circulated in this circuit is the same fluid that is being pumped by the primary impeller on shaft 7 inasmuch as the fluid can pass between bearing 18 and collar 20. This arrangement is suitable in many cases and no additional fluid is required.

In order that the coolant may be circulated within the end flange 43 rotating member 32 is formed to act as a secondary impeller. As seen in Figure 2, member 32 has a plurality of transverse concave depressions such as 55, 56, 57, 58, 59, 60 and 61 on its periphery. As the rotating member 32 turns, fluid will be lifted in these depressions and impelled around the annular pressure chamber 63 until it strikes the deflection piece 65.

Deflection piece 65 may be seen best in the broken sectional view of Figure 3. It is a metallic insert which is welded across the annular pressure chamber 63, at one side of the intersection of chamber 63 and outlet passage 51. When the fluid strikes piece 65 it is backed up and diverted out through outlet passage 51. Deflection piece 65 may be a solid member welded into place, or it may be built up by deposits of weld metal.

In order to prevent any slight leakage of fluid between flange 43 and sleeve 11, outwardly of fixed member 39, packing 67 may be used. It is squeezed in place by means of ring 69, which has ears 71, through which bolts 73 may be passed. The bolts 73 are threaded into flange 43, and are held in place by nuts 74.

As a further precaution against any slight leakage of fluid which may collect on the outward side of fixed member 39, drain passage 76 is provided.

It will be apparent that the seal assembly illustrated in Figure 1 is such that it is susceptible of use with a variety of pump housings. Since it fits within a stuffing box, it does not have to be specially designed to fit the internal configuration of a particular pump. The entire unit may be easily set into place and removed without complete disassembly of the pump. With minor adjustments it can be readily adapted to stuffing boxes of varying dimensions. It is also unnecessary to machine the internal wall of the pump stuffing box to provide an annular pressure chamber such as 63 since the cooling circuit for the seal is outside the stuffing box.

The species of Figure 4 is similar to that of Figure 1, and the general objectives of this embodiment are similar. However, there are various structural differences.

In the species of Figure 4 a primary pump impeller 102 is mounted on the shaft 103. Sleeve 105 is affixed to shaft 103 by means of set screw 106. The sleeve 105 contains an O-ring 108 to prevent the flow of fluid between the sleeve 105 and the shaft 103. Cylindrical throttle bushing 110 may be carried within the pump housing. Since the pump housing is split and the halves bolted together in a horizontal plane, the throttle bushing may be set into place before the halves are joined.

A cup shaped member 115 is fitted tightly onto sleeve 105. Two pins such as 117 extend through slots such as 118 of member 115. They also extend through slots 120 of spring holder 123. Pins 117 are T-shaped in cross-section with the heads 124 arranged so that they will engage the inside of cup member 115. This prevents the pins from working radially outward of the member 115.

Carried within spring holder 123 is spring 126. Spring 126 is effective to force spring holder 123 against sealing element 128 which in turn bears against the rotating member 130 of mechanical seal 134. Member 130 is formed with two longitudinally extending tongs such as 131. Tongs 131 extend within slots 132 of spring holder 123. This provides a connection whereby member 130 rotates together with spring holder 123, sleeve 105, and shaft 103.

Member 130 is preferably made of stellite. It forms a seal with fixed member 135 of mechanical seal 134. Fixed member 135 cannot rotate because of its frictional engagement with O-ring 137. O-ring 137 is restrained from rotation by its frictional contact with flange 151 of member 148. This configuration is effective to prevent leakage of fluid between member 130 and shaft sleeve 105, as well as between members 130 and 135 of the mechanical seal 134.

If desired, or if already provided within the pump casing, product circulation passage 140 may be utilized. Fluid being pumped by impeller 102 is bled off at high pressure and return to passage 140. The fluid fills the stuffing box; and circulates out between throttle bushing 110 and shaft 105 back to impeller 102. This flow cools mechanical seal 134, and helps prevent settlement of dirt on the seal parts.

End flange 143 is fastened to housing 113 by means of a plurality of bolts and nuts such as 145 and 146. The end flange 143 bears against a cylindrical mounting sleeve 148, which is sealed against housing wall 113 by means of O-ring 150. Sleeve 148 is internally flanged at 151 to provide a reaction surface against which O-ring 137 is pressed.

Affixed to the shaft sleeve 105 is the ring member 152. Two diametrically opposite slots such as 153 are milled out of member 152 so that pins such as 155 may be inserted therein. Cup shaped member 157 is carried over the ring member 152. Cup shaped member 157 has holes drilled within it so that the pins 155 may extend radially outwardly through them. The pins 155 extend within longitudinal grooves such as 159 of the second spring holder 160. Spring 162 is carried within the spring holder 160 and is effective to force spring holder 160 against sealing element 163. Rotating member 165 of the mechanical seal 167 contains two longitudinally extending tongues such as 169, insertable into slots such as 170 of the spring holder 160. By this arrangement the member 165 is rotated with the spring holder and the shaft 103. The member 165 which is preferably made from stellite cooperates to form a mechanical seal with stationary member 172. Stationary member 172 is held against rotation by frictional contact with the O-ring 173.

A fluid flow circuit into the flange member 143 is provided by means of the inlet tap 175 the longitudinal channel 177, the annular pressure chamber 178, the outlet tap 180, the heat exchanger 181, and reservoir 183. It will be noted that in the embodiment of Figure 3 the cooling and lubricating fluid which is circulated within the end flange 143 is independent of the fluid being pumped by the primary impeller 102.

The cooling fluid is pumped through the end flange 143 by means of the secondary impeller formed on the periphery of spring holder 160. Spring holder 160 is similar to member 32 of Figure 2 in that a series of transverse concave depressions spaced along its periphery builds up pressure within annular pressure chamber 178. As the spring holder 160 rotates, fluid is impelled against deflection piece 185 and is forced out through the outlet tap 180. Deflection piece 185 is similar to and carried within pressure chamber 178, just as piece 65 is in Figure 3. Because the annular pressure chamber is essentially isolated from the fluid around the mechanical seal 167, but yet is in communication therewith by channel 177, the high pressure within the annular pressure chamber 178 is effective to cause circulation of the fluid out through the heat exchanger 181, the reservoir 183 and back into the inlet tap 175.

It is seen from the above description that the seal assemblies disclosed herein represent an important advance in the art. They make it possible to provide an effective seal in pumps of varying dimensions. By relatively simple adjustments, which do not involve machining of the internal walls of pump stuffing boxes, the seals may be easily adapted for use with pumps in the field, which have special sealing problems. They are unusually effective in pumps handling high temperature fluids, since the seal parts are cooled to practical working temperatures.

Various changes may be made from the forms herein disclosed without varying or departing from the terms of the invention. Such changes will be apparent to those skilled in the art but they will be found to be within the scope of the following claims.

What I claim is:

1. An assembly for sealing a rotating shaft within a housing comprising a flange member detachably secured to and outside of the housing, seal means within the flange to prevent flow along the shaft outwardly of the flange member, said seal means including a part that rotates with the shaft, said part having impeller means formed on its periphery, a fluid inlet passage into the flange, an outlet passage out of the flange, said outlet passage being spaced axially of the assembly from said inlet passage, an annular pressure chamber formed within the flange and communicating with the innermost end of the outlet passage, said pressure chamber being immediately adjacent said impeller means.

2. In the assembly of claim 1, a deflection member set across the annular pressure chamber to one side of its communication with the innermost end of the outlet passage, whereby rotation of said part is effective to impel fluid against the deflection member and out through the said outlet passage.

3. A mechanical seal assembly comprising a stationary flange having a central opening therethrough, a rotatable member extending through said flange opening, a pair of relatively rotatable annular sealing elements encircling said rotatable member and having coengaged radially extended sealing faces interposed in said flange opening between said flange and said rotatable member, one of said sealing elements being stationarily connected to said flange and the other of said sealing elements being mounted upon said rotatable member for rotation therewith, means biasing said sealing elements relatively towards one another, said flange having a cooling fluid inlet communicating wtih said flange opening adjacent to one of said sealing elements, said flange also having a cooling fluid outlet passage communicating with said flange opening adjacent to the other of said sealing elements, means rotatable with said rotatable sealing element for impelling the circulation of cooling fluid from said inlet to said outlet passage, said outlet passage being spaced axially of the assembly from said inlet passage, said flange having a pressure chamber therein, adjacent to said impelling means, and said outlet passage communicating at its inner end with said pressure chamber.

4. An assembly for sealing a rotating shaft within a housing, comprising a flange member detachably secured to said housing, seal means within the flange to prevent the flow of fluid along the shaft outwardly of the flange member, said seal means including a part that rotates with the shaft, said part having impeller means, a fluid inlet passage into the flange, a fluid outlet passage out of the flange, said outlet passage being spaced axially of the assembly from said inlet passage, an annular pressure chamber formed within the flange and communicating with the innermost end of the outlet passage, said chamber being immediately adjacent said impeller means.

5. An assembly for sealing a rotatable shaft within a housing comprising a flange member detachably secured to an external face of said housing, seal means within the flange to prevent flow along the shaft outwardly of the flange member, said seal means including a part rotatable with the shaft, impeller means rotatable with said seal part, a fluid inlet passage into the flange, a fluid outlet passage out of the flange, said outlet passage being spaced axially of the assembly from said inlet passage, means defining between said impeller means and said flange a circumferentially extending pressure chamber communicating with the innermost end of the outlet passage, said pressure chamber being immediately adjacent said impeller means.

6. An assembly as defined in claim 5, wherein said pressure chamber is in the form of a circumferentially extended groove in said flange, and including a deflection member disposed across said groove to one side of the innermost end of the outlet passage, whereby rotation of said impeller means is effective to impel fluid against the deflection member and outwardly through said outlet passage.

References Cited in the file of this patent

UNITED STATES PATENTS

| | | |
|---|---|---|
| 1,759,074 | Van Rijswijk | May 20, 1930 |
| 2,247,505 | Kohler | July 1, 1941 |
| 2,323,730 | Shenton et al. | July 6, 1943 |
| 2,584,705 | Hornschuch | Feb. 5, 1952 |
| 2,601,997 | Lewis | July 1, 1952 |
| 2,687,096 | Armacost | Aug. 24, 1954 |
| 2,797,940 | Michener et al. | July 2, 1957 |